United States Patent
Kim et al.

(10) Patent No.: US 11,346,351 B2
(45) Date of Patent: May 31, 2022

(54) BEARING COMPRISING AN INNER RING EITHER IN CONTACT WITH A ROTATING SHAFT OR FORMING A GAP BETWEEN THE INNER RING AND ROTATING SHAFT DEPENDING ON AIR PRESSURE FROM AN IMPELLER

(71) Applicant: LG ELECTRONICS INC., Seoul (KR)

(72) Inventors: Changlae Kim, Seoul (KR); Sunggi Kim, Seoul (KR); Byungjik Kim, Seoul (KR); Taeho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 16/688,331

(22) Filed: Nov. 19, 2019

(65) Prior Publication Data

US 2020/0166045 A1 May 28, 2020

(30) Foreign Application Priority Data

Nov. 23, 2018 (KR) .................. 10-2018-0146314

(51) Int. Cl.
*F04D 25/06* (2006.01)
*F04D 27/00* (2006.01)
(Continued)

(52) U.S. Cl.
CPC ......... *F04D 25/062* (2013.01); *F04D 27/004* (2013.01); *F04D 29/057* (2013.01);
(Continued)

(58) Field of Classification Search
CPC ........ F04D 29/052; F04D 29/04; F04D 29/05; F16D 13/44; F16C 17/20; F16C 32/0402
See application file for complete search history.

(56) References Cited

U.S. PATENT DOCUMENTS

| 3,642,331 A | 2/1972 | Silver |
| 4,394,091 A | 7/1983 | Klomp |

(Continued)

FOREIGN PATENT DOCUMENTS

| DE | 102011085025 | | 4/2013 | |
| JP | 63-9722 | * | 1/1988 | ............. F16C 32/00 |

(Continued)

OTHER PUBLICATIONS

Extended European Search Report in European Appln. No. 19207377. 3, dated Mar. 24, 2020, 3 pages.

(Continued)

*Primary Examiner* — Nathan C Zollinger
*Assistant Examiner* — Timothy P Solak
(74) *Attorney, Agent, or Firm* — Fish & Richardson P.C.

(57) ABSTRACT

A motor includes a bearing having a rolling member disposed between an inner ring and an outer ring, a spring connected to the outer ring, and a pusher connected to the spring and configured to move to a first position spaced apart from the inner ring by the spring. The pusher is further configured to move to a second position at which friction with the inner ring is caused by a pressure of air. The inner ring is spaced apart from the rotating shaft by a gap between the inner ring and the rotating shaft when the pusher is at the second position.

20 Claims, 7 Drawing Sheets

(51) Int. Cl.

| | | |
|---|---|---|
| *F16D 13/44* | (2006.01) | |
| *F04D 29/057* | (2006.01) | |
| *F16C 21/00* | (2006.01) | |
| *F16C 17/20* | (2006.01) | |
| *A45D 20/00* | (2006.01) | |
| *F16C 19/54* | (2006.01) | |
| *F16C 32/04* | (2006.01) | |

(52) U.S. Cl.
CPC .............. *F16C 17/20* (2013.01); *F16C 21/00* (2013.01); *F16D 13/44* (2013.01); *A45D 20/00* (2013.01); *F05D 2240/53* (2013.01); *F16C 19/546* (2013.01); *F16C 32/0402* (2013.01)

(56) References Cited

U.S. PATENT DOCUMENTS

| | | | |
|---|---|---|---|
| 10,903,714 B2 | 1/2021 | Hwang et al. | |
| 11,025,127 B2 | 6/2021 | Hwang et al. | |
| 2013/0170943 A1 | 7/2013 | Jonsson et al. | |
| 2015/0049970 A1* | 2/2015 | Carnahan ............... | F16C 17/246 384/448 |
| 2016/0312826 A1* | 10/2016 | Kawashima .......... | F04D 29/058 |
| 2017/0268524 A1* | 9/2017 | Kanai .................... | F04D 29/056 |

FOREIGN PATENT DOCUMENTS

| | | | | |
|---|---|---|---|---|
| JP | 63-68301 | * | 1/1988 | .............. F16C 32/00 |
| JP | 2002369474 | | 12/2002 | |
| KR | 1020140070902 | | 6/2014 | |
| KR | 20180028842 | | 3/2018 | |
| KR | 20180029674 | | 3/2018 | |
| KR | 20180050850 | | 5/2018 | |
| TW | M367518 | | 10/2009 | |
| WO | WO2017/154935 | | 9/2017 | |

OTHER PUBLICATIONS

Australian Office Action in Australian Appln. No. 2019268133, dated Sep. 22, 2020, 5 pages.

Taiwan Office Action in Taiwan Appln. No. 108137119, dated Aug. 24, 2020, 3 pages.

Notice of Allowance in Korean Appln. No. 10-2019-0107677, dated Nov. 12, 2021, 4 pages (with English translation).

* cited by examiner

BEARING COMPRISING AN INNER RING EITHER IN CONTACT WITH A ROTATING SHAFT OR FORMING A GAP BETWEEN THE INNER RING AND ROTATING SHAFT DEPENDING ON AIR PRESSURE FROM AN IMPELLER

CROSS-REFERENCE TO RELATED APPLICATIONS

This application claims the benefit of priority to Korean Patent Application No. 10-2018-0146314, filed on Nov. 23, 2018, the entire contents of which are incorporated herein by reference.

BACKGROUND OF THE INVENTION

1. Field of the Invention

The present disclosure relates to a motor, and more particularly, to a motor having a bearing.

2. Discussion of the Related Art

A motor may be installed in a household appliance such as a cleaner or a hair dryer, and in this case, may serve as a driving source for generating a driving force for flowing air.

One example of such a motor may include a motor housing, a stator installed in the motor housing, a rotor rotated by the stator, a rotating shaft on which the rotor is mounted, and an impeller connected to the rotating shaft.

The rotating shaft of the motor may be rotatably supported by at least one bearing, and the rotating shaft may be rotated at a low speed or rotated at a high speed while being supported by the bearing. When the motor is a low speed motor capable of rotating at a low speed, it is possible for a rolling bearing whose the inner ring is in close contact with the rotating shaft to support the rotating shaft.

Since the rolling bearing supports the rotating shaft in a state of being in contact with the outer circumference of the rotating shaft, there is an advantage that the rolling bearing may stably support the rotating shaft when the rotating shaft rotates at a low speed.

On the other hand, the rolling bearing has a disadvantage in that noise increases and possibility of fatigue breakdown increases when the rotating shaft rotates at a high speed due to high contact stress and frictional force.

In a case where the motor is a high speed motor capable of rotating at a high speed of tens of thousands of RPM, when the rolling bearing supports the rotating shaft, the noise and heat generation of the rolling bearing may be too large. In the case of the high speed motor, it is preferable that a gas bearing that supports the rotating shaft by gas such as air in an air gap between the rotating shaft and the bearing supports the rotating shaft.

However, the gas bearing has a disadvantage in that an air gap is not formed between the gas bearing and the rotating shaft due to the contact between the gas bearing and the rotating shaft during low speed rotation of the rotating shaft, or the gas bearing or the rotating shaft is likely to be easily damaged due to the friction between the gas bearing and the rotating shaft. In addition, when the rotating shaft is rotated at a high speed and is then stopped, the rotating shaft may hit the gas bearing, and thus there is a high risk of damage to the gas bearing or the rotating shaft.

On the other hand, in recent years, there is an increasing trend of a motor capable of rotating the rotating shaft at high speed, and it is preferable that such a motor supports the rotating shaft reliably and stably in the entire speed range including the low speed and the high speed of the rotating shaft.

SUMMARY OF THE INVENTION

An object of the present disclosure is to provide a motor capable of stably supporting a rotating shaft in the entire speed range including a low speed and a high speed with a simple structure.

According to an aspect of the present disclosure, a motor includes a rotating shaft; a rotor and an impeller connected to the rotating shaft; a bearing in which a rolling member is disposed between an inner ring and an outer ring, an inner diameter of the inner ring being larger than an outer diameter of the rotating shaft; a spring connected to the outer ring; and a pusher connected to the spring to be retracted to a first position spaced apart from the inner ring by the spring, and to be advanced to a second position at which friction with the inner ring is caused by a pressure of air acting on a pressure surface when the pressure surface on which the pressure of air flowing by the impeller acts is formed, wherein the inner ring is rotated with the rotating shaft by friction with the rotating shaft when the pusher is at the first position, and wherein the inner ring is spaced apart from the rotating shaft by a gap formed between the inner ring and the rotating shaft when the pusher is at the second position.

The pusher may include a moving body formed with the pressure surface and elastically supported by the spring to be retracted to the first position; and a friction pad attached to the moving body and configured to cause friction with the inner ring when the pusher is at the second position.

An inner diameter of the moving body may be larger than an outer diameter of the rotating shaft.

An inner diameter of the moving body may be larger than an inner diameter of the inner ring.

The moving body may be formed with a spring receiving groove in which the spring is received, the spring receiving groove being formed on a side opposite to the pressure surface.

The moving body may be formed with a spring connection portion in the spring receiving groove.

The moving body may be formed with a friction pad fixing surface to which the friction pad is attached, the friction pad fixing surface being formed on the side opposite to the pressure surface.

The frictional force between the friction pad and the inner ring may be greater than frictional force between the inner ring and the rotating shaft.

An outer diameter of the friction pad may be smaller than an inner diameter of the spring.

An inner diameter of the friction pad may be larger than an outer diameter of the rotating shaft.

The bearing and the pusher may be axially positioned between the rotor and the impeller.

The motor may further include a bearing housing formed with a bearing receiving portion configured to support the bearing.

The pusher and the spring may be received in the bearing receiving portion.

The motor may further include a sub bearing axially spaced apart from the bearing to support the rotating shaft with the bearing.

The sub bearing may support the rotating shaft between the bearing and the rotor.

The sub bearing may be a ball bearing of which a ball is disposed between the inner ring and the outer ring, and the rotating shaft may be pressure-fitted onto an inner ring of the sub bearing.

According to another aspect of the present disclosure, a motor includes a rotating shaft; a rotor and an impeller connected to the rotating shaft; a bearing in which a rolling member is disposed between an inner ring and an outer ring, an inner diameter of the inner ring being larger than an outer diameter of the rotating shaft; a bearing housing formed with a bearing receiving portion configured to support the bearing; and a pusher disposed within the bearing receiving portion to move a first position spaced apart from the inner ring and a second position restricting the inner ring, wherein an inner diameter of the inner ring is larger than an outer diameter of the rotating shaft, and the inner ring is spaced apart from the rotating shaft by a gap formed between the inner ring and the rotating shaft when the pusher is at the second position.

The motor may further include a spring configured to retract the pusher to the first position between the pusher and the outer ring.

The pusher may include a moving body formed with a pressure surface on which the pressure of air flowing by the impeller acts and elastically supported by the spring to be retracted to the first position; and a friction pad attached to the moving body and configured to cause friction with the inner ring when the pusher is at the second position.

An inner diameter of the moving body may be larger than an outer diameter of the rotating shaft, and may be larger than an inner diameter of the inner ring.

The frictional force between the friction pad and the inner ring is greater than frictional force between the inner ring and the rotating shaft.

DETAILED DESCRIPTION OF THE PREFERRED EMBODIMENTS

Exemplary embodiments of the present disclosure will be described below in detail with reference to the accompanying drawings in which the same reference numbers are used throughout this specification to refer to the same or like parts. In describing the present disclosure, a detailed description of known functions and configurations will be omitted when it may obscure the subject matter of the present disclosure.

Hereinafter, specific embodiments of the present disclosure will be described in detail with reference to the drawings.

Figure 1:
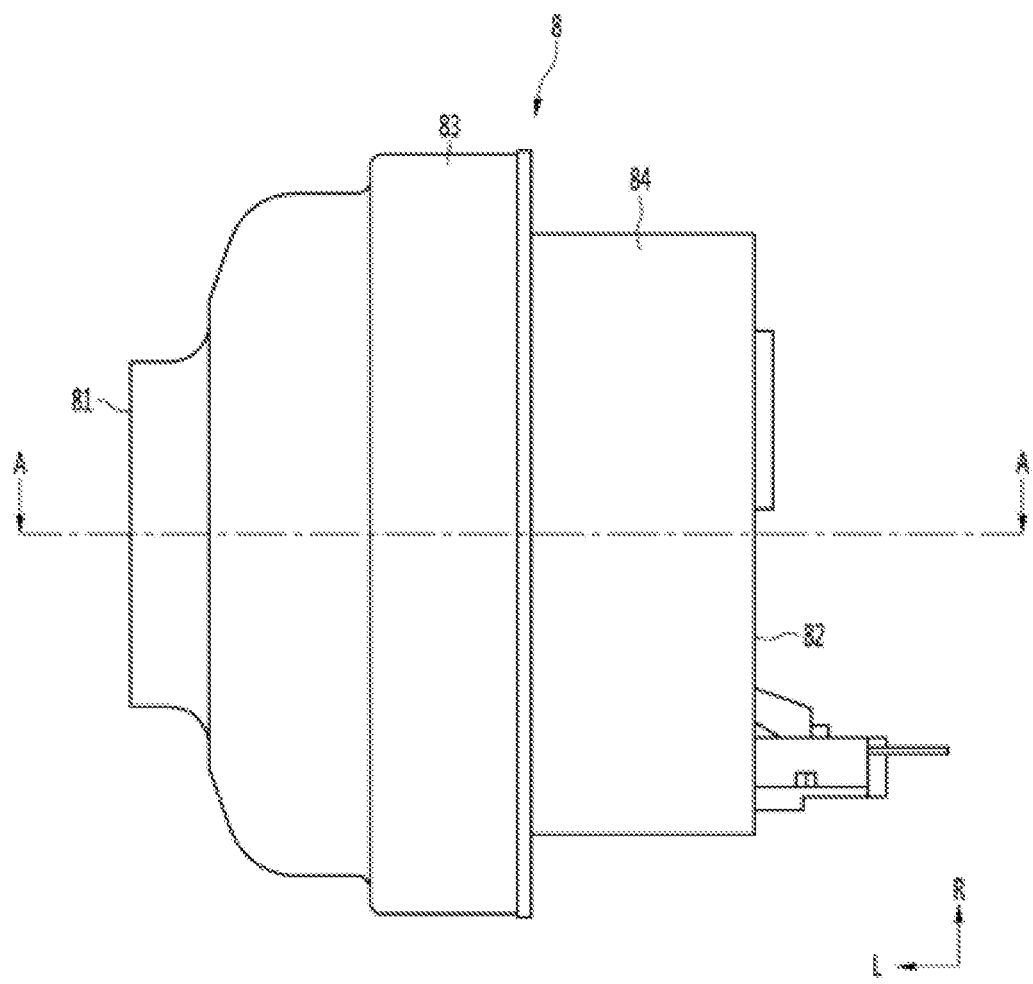
FIG. 1 is a side view of a motor according to an embodiment of the present disclosure.
Figure 2:
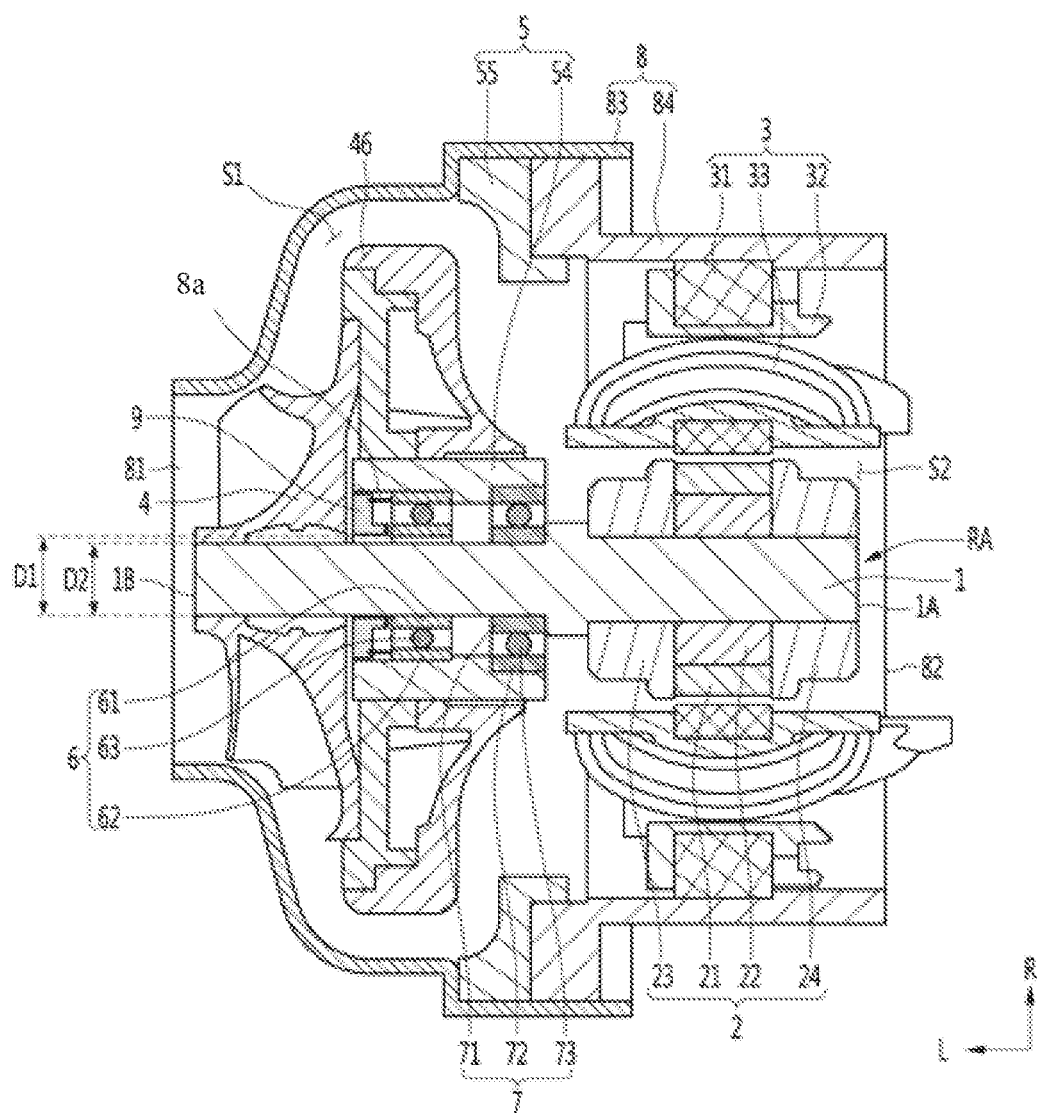
FIG. 2 is a cross-sectional view taken along line A-A of FIG. 1.
Figure 3:
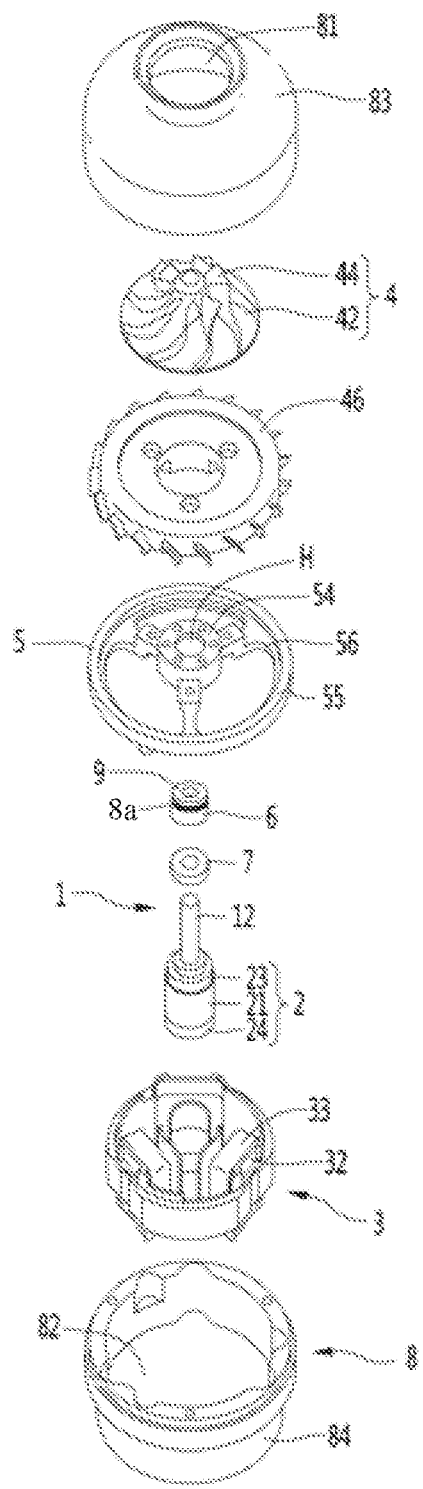
FIG. 3 is an exploded perspective view of a motor according to an embodiment of the present disclosure.

FIG. 1 is a side view of a motor according to an embodiment of the present disclosure, FIG. 2 is a cross-sectional view taken along line A-A of FIG. 1 and FIG. 3 is an exploded perspective view of a motor according to an embodiment of the present disclosure.

A motor may include a rotating shaft 1, a rotor 2, a stator 3, an impeller 4 and a bearing 6, and the motor may further include a bearing changing mechanism (i.e., a bearing switching mechanism) which may enable the bearing 6 to operate as a rolling bearing or as a gas bearing.

The motor may further include a motor body 8 forming its outer surface. An impeller space S1 in which the impeller 4 is accommodated may be formed in the motor body 8. In addition, a motor space S2 in which the rotor 2 and the stator 3 are accommodated may be formed in the motor body 8.

The motor body 8 may have a suction port 81 through which air is sucked into the impeller space S1. In addition, an exhaust port 82 through which air in the motor space S2 is discharged to the outside of the motor may be formed in the motor body 8.

The motor body 8 may be formed of a single member or may be composed of a combination of a plurality of members.

When the motor body 8 is a combination of a plurality of members, the motor body 8 may include an inlet body 83 and a motor housing 84.

A suction port 81 through which air is sucked may be formed in the inlet body 83. The inlet body 83 may be arranged to surround the outer circumference of the impeller 4. An impeller space S1 in which the impeller 4 is rotatably received may be formed inside the inlet body 83.

The inlet body 83 may be coupled to the motor housing 84 at the opposite side of the suction port 81. The inlet body 83 may surround all or part of the outer circumference of the motor housing 84.

The motor housing 84 may surround the outer circumference of the stator 3. The motor space S2 in which the rotating shaft 1, the rotor 2, and the stator 3 are received may be formed inside the motor housing 84. The motor housing 84 may be provided with an exhaust port 82 through which the air introduced into the motor space S2 after flowing by the impeller 4 is discharged to the outside of the motor body 8. The exhaust port 82 may be formed at the opposite side of the suction port 81.

The motor housing 84 may be a hollow body inside which the motor receiving space S2 is formed.

The rotating shaft 1 may be disposed to extend from the motor space S2 to the impeller space S1. One end 1A of the rotating shaft 1 may be positioned in the motor space S2, and the other end 1B of the rotating shaft 1 may be positioned in the impeller space S2.

The rotating shaft 1 may be supported by a bearing 6 and a sub bearing 7 which is described later.

The rotor 2 may be mounted to the rotating shaft 1. The rotor 2 may be arranged to surround the outer circumference of the rotating shaft 1. The rotor 2 may be mounted to a portion of the rotating shaft 1 received in the motor space S2.

The rotor 2 may be spaced apart from the bearing 6 and the sub bearing 7 in the axial direction L, respectively.

The rotor 2 may include a magnet 21. The rotor 2 may further include a magnet core 22 on which the magnet 21 is mounted. The rotor 2 may further include a pair of end plates 23 and 24 spaced apart from each other in the axial direction L.

The rotor 2 may constitute a rotor assembly RA together with the rotating shaft 1 and the impeller 4.

The stator 3 may be arranged to surround the outer circumference of the rotor 2. The stator 3 may be disposed in the inner circumference of the motor body 8. The stator 3 may be disposed in the inner circumference of the motor housing 14. The stator 3 may include a stator core 31, an insulator 32 disposed on the stator core 31, and a coil 33 wound around the insulator 32.

The impeller 4 may be mounted to the rotating shaft 1 to be spaced apart from the rotor 2. The impeller 4 may be mounted spaced apart from the rotor 2. The impeller 4 may be spaced apart from the rotor 2 in the axial direction L.

The impeller 4 may be a centrifugal impeller that sucks gas such as air in the axial direction L and discharges the gas in the centrifugal direction R. The impeller 4 may include a hub 42 and a plurality of blades 44 formed on the outer circumference of the hub 42.

The motor may further include a diffuser 46 for guiding the air flowing in the impeller 4. The diffuser 46 may be located inside the motor body 8, in particular, the inlet body 83, the outer circumference thereof may face the inner circumferential surface of the motor body 8, in particular, the inlet body 83.

Between the diffuser 46 and the inlet body 83, a passage for guiding gas such as air flowing by the impeller 4 to the motor space S2 may be formed.

The motor may further include a bearing housing 5 supporting the bearing 6.

A part or the whole of the bearing housing 5 may be located between the impeller 4 and the rotor 2. The bearing housing 5 may have a through hole H through which the rotating shaft 1 passes. The bearing housing 5 may surround the outer circumference of a part of the rotating shaft 1.

The bearing housing 5 may be formed integrally with the motor body 8, or may be manufactured separately from the motor body 8 and then coupled to the motor body 8. When the bearing housing 5 is formed integrally with the motor body 8, the assembly tolerance may be minimized.

When the bearing housing 5 is manufactured separately from the motor body 8, the bearing housing 5 may be fastened to the motor body 8 using a fastening member such as a screw. As an example, the bearing housing 5 may be fastened to the inlet body 13 or the motor housing 14.

The bearing housing 5 may include a bearing receiving portion 54 supporting the bearing 6. The bearing housing 5 may further include a fastening portion 55 fastened to the motor body 8 using a fastening member such as a screw. The bearing housing 5 may further include a plurality of bridge portions 56 connecting the bearing receiving portion 54 and the fastening portion 55.

The bearing receiving portion 54 may be located between the rotor 2 and the impeller 4 in the axial direction L.

The bearing 6 may be a rolling bearing in which a rolling member 63 is disposed between an inner ring 61 and an outer ring 62, and an inner diameter D1 of the inner ring 61 of the bearing 6 may be larger than an outer diameter D2 of the rotating shaft 1.

A portion of the rotating shaft 1 facing the bearing 6 (i.e., a bearing-opposing portion) may hang downward by the self-weight or gravity of the rotating shaft 1. As shown in FIG. 2, when the motor lies on its side or lies inclined at a predetermined angle, a part of the outer circumference of the rotating shaft 1 may be in contact with and rub against the inner ring 61 of the bearing 6. In the friction between the inner ring 61 of the bearing 6 and the rotating shaft 1, when the rotating shaft 1 is rotated, the inner ring 61 of the bearing 6 may be rotated with the rotating shaft 1, in which the bearing 6 may function as a rolling bearing.

The bearing 6 may be arranged to be housed inside the bearing housing 5, in particular, the bearing receiving portion 54, the outer ring 62 of the bearing 6 may be in contact with an inner surface of the bearing receiving portion 54 and be fixed to the bearing housing 5.

The sub bearing 7 may be a ball bearing in which a ball 73 is disposed between the inner ring 71 and the outer ring 72, and may support the rotating shaft 1 with the bearing 6 in a state of being spaced apart from the bearing in the axial direction L.

The inner diameter of the inner ring 71 of the sub bearing 7 may be equal to the outer diameter of the rotating shaft 1. The rotating shaft 1 may be press-fitted into the inner ring 71 of the sub bearing 7.

The sub bearing 7 may be disposed together with the bearing 6 in the bearing housing 5, in particular, in the bearing receiving portion 54. When the sub bearing 7 is a ball bearing, the outer ring 72 of the sub bearing 7 may be in contact with the inner surface of the bearing receiving portion 54 and be fixed to the bearing housing 5.

The bearing 6 and the sub bearing 7 may be disposed to be spaced apart from each other in the axial direction L in the bearing housing 5, and the bearing 6 and the sub bearing 7 may support the rotating shaft 1 more stably.

On the other hand, the sub bearing 7 is not limited to being composed of a ball bearing, but may also be composed of a magnetic bearing, a gas bearing, or the like. The sub bearing 7 may not be limited to its type as long as the sub bearing 7 supports the rotating shaft 1 together with the bearing 6. Although the sub bearing 7 is shown as being located between the bearing 6 and the rotor 2, the sub bearing 7 may support the rotating shaft 1 between the bearing 6 and the impeller 4.

The motor may be arranged in the order of the rotor 2, the sub bearing 7, the bearing 6, and the impeller 4 in the axial direction, or may be also arranged in the order of the rotor 2, the bearing 6, and the sub bearing 7 and the impeller 4 in the axial direction.

The motor may further include a spring 8a connected to the outer ring 62 of the bearing 6 and a pusher 9 connected to the spring 8a. The spring 8a and the pusher 9 may constitute a bearing changing mechanism capable of changing a rotating-shaft supporting method (or principle) of the bearing 6.

The pusher 9 may be moved by the pressure of the air flowing by the impeller 4, and the pusher 9 may or may not be in contact with the inner ring 61 of the bearing 6 depending on a position of the pusher 9.

The pusher 9 may be arranged to be movable inside the bearing housing 5, in particular the bearing receiving portion 54, and may be protected by the bearing housing 5.

Figure 4:
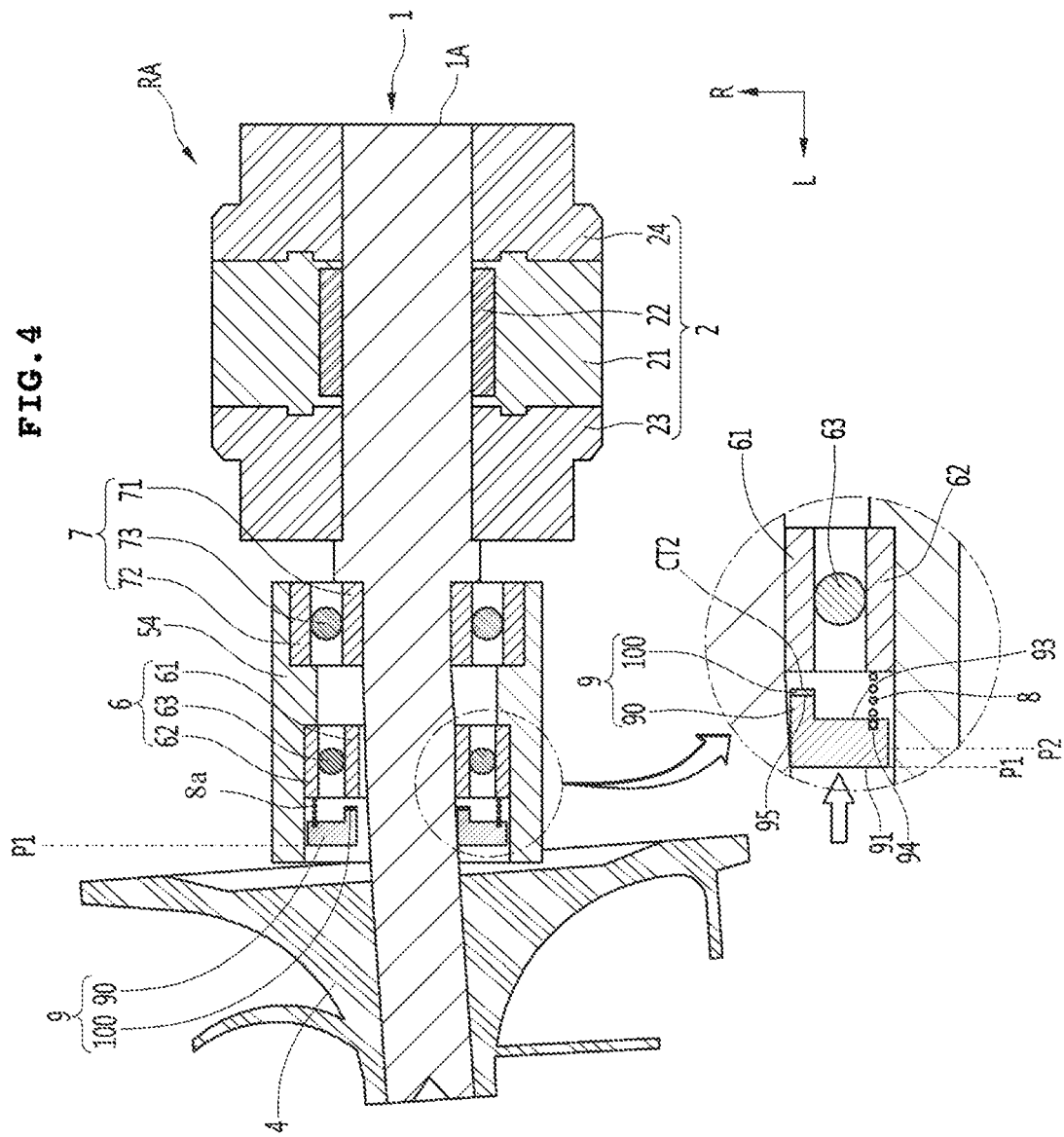
FIG. 4 is a longitudinal cross-sectional view showing a rotor assembly when a rotating shaft is stopped or is rotated at a low speed according to an embodiment of the present disclosure.

When the pusher 9 is disposed inside the bearing receiving portion 54 of the bearing housing 5, the pusher 9 may be advanced toward the inner ring 61 of the bearing 6 inside the bearing receiving portion 54 to be in contact with and rubbed against the bearing 6 (see FIG. 4). Furthermore, the pusher 9 may be retracted in the direction opposite to the inner ring 61 of the bearing 6 inside the bearing receiving portion 54 not to be in contact with the inner ring 61 of the bearing 6 (see FIG. 6).

The spring 8a may be arranged between the outer ring 62 of the bearing 6 and the pusher 9. The spring 8a may be located inside the bearing receiving portion 54 along with the pusher 9 and may be protected by the bearing housing 5.

Figure 5:
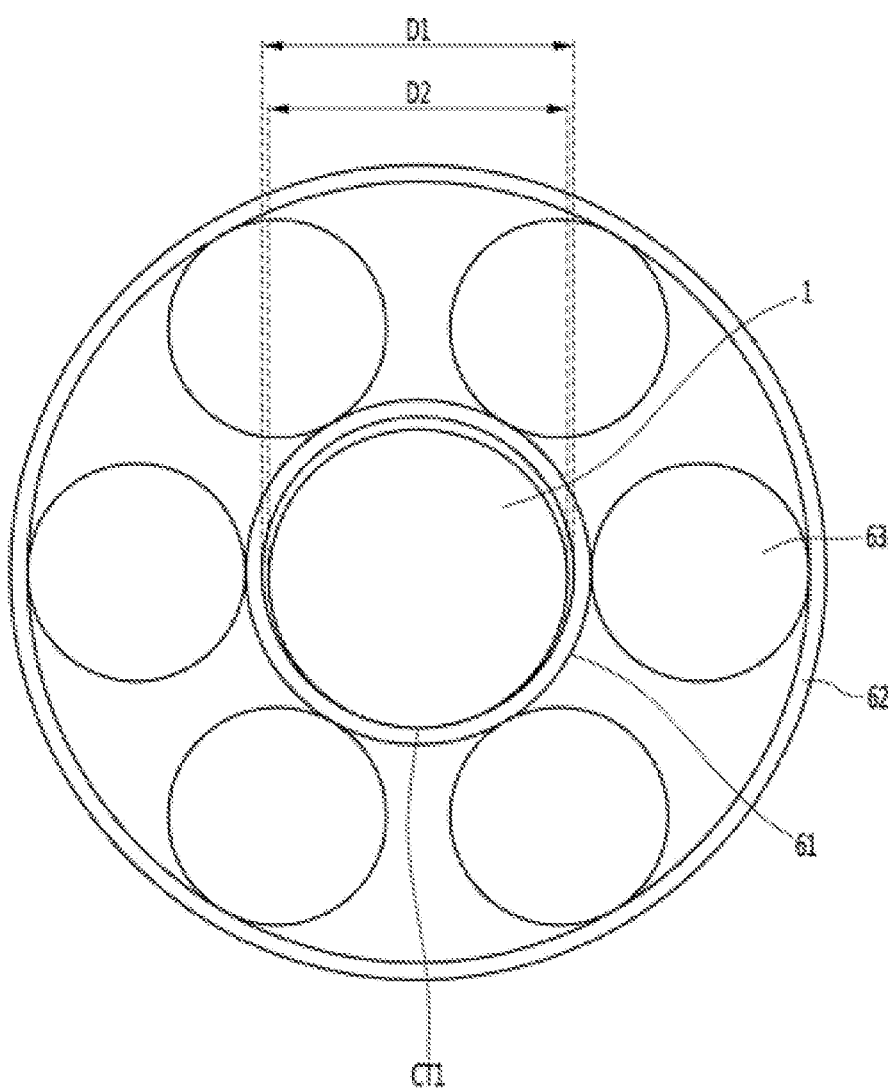
FIG. 5 is a view showing a rotor assembly when a rotating shaft is stopped or rotated at a low speed according to an embodiment of the present disclosure.
Figure 6:
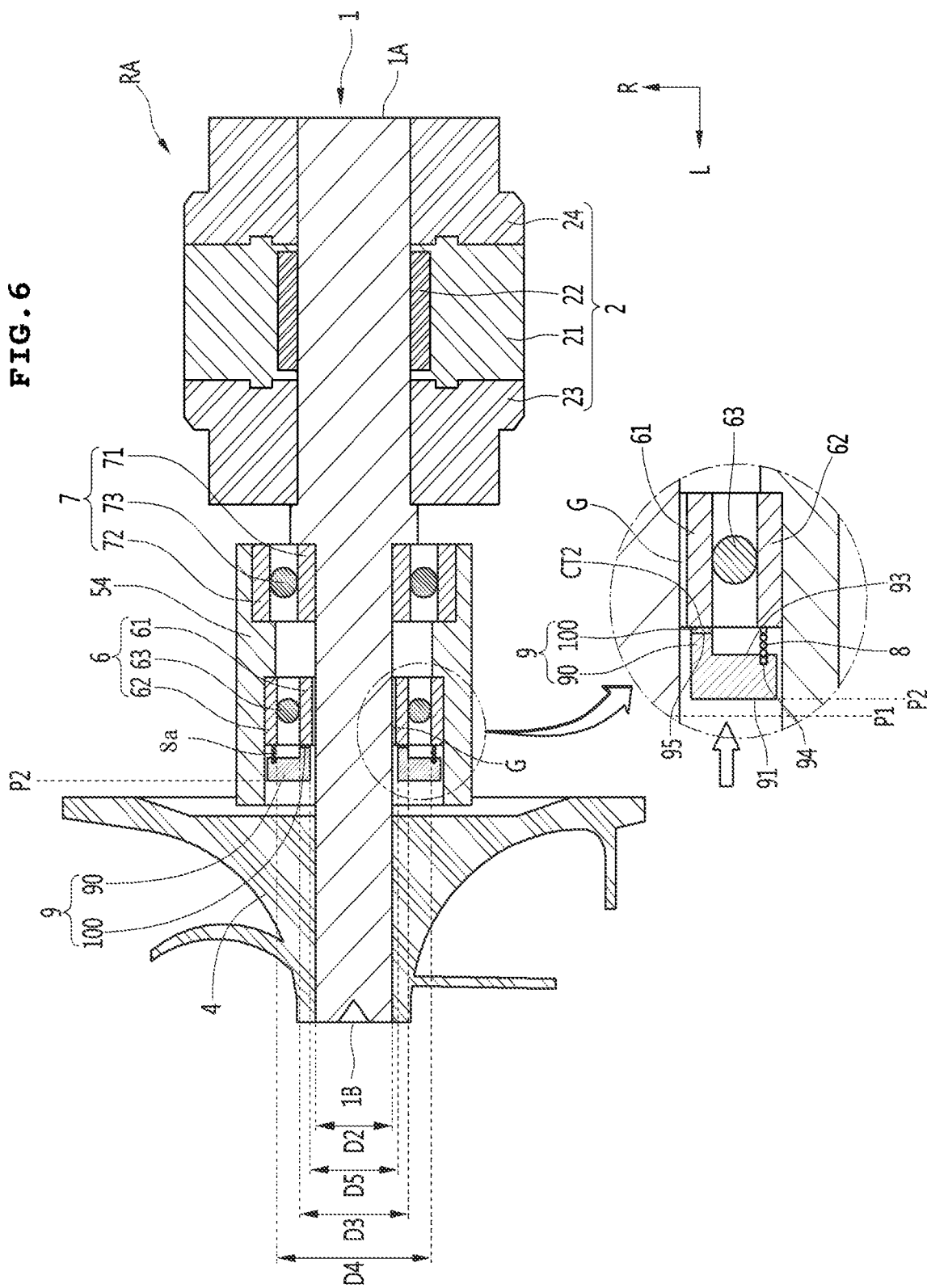
FIG. 6 is a longitudinal cross-sectional view showing a rotor assembly when a rotating shaft is rotated at a high speed according to an embodiment of the present disclosure.
Figure 7:
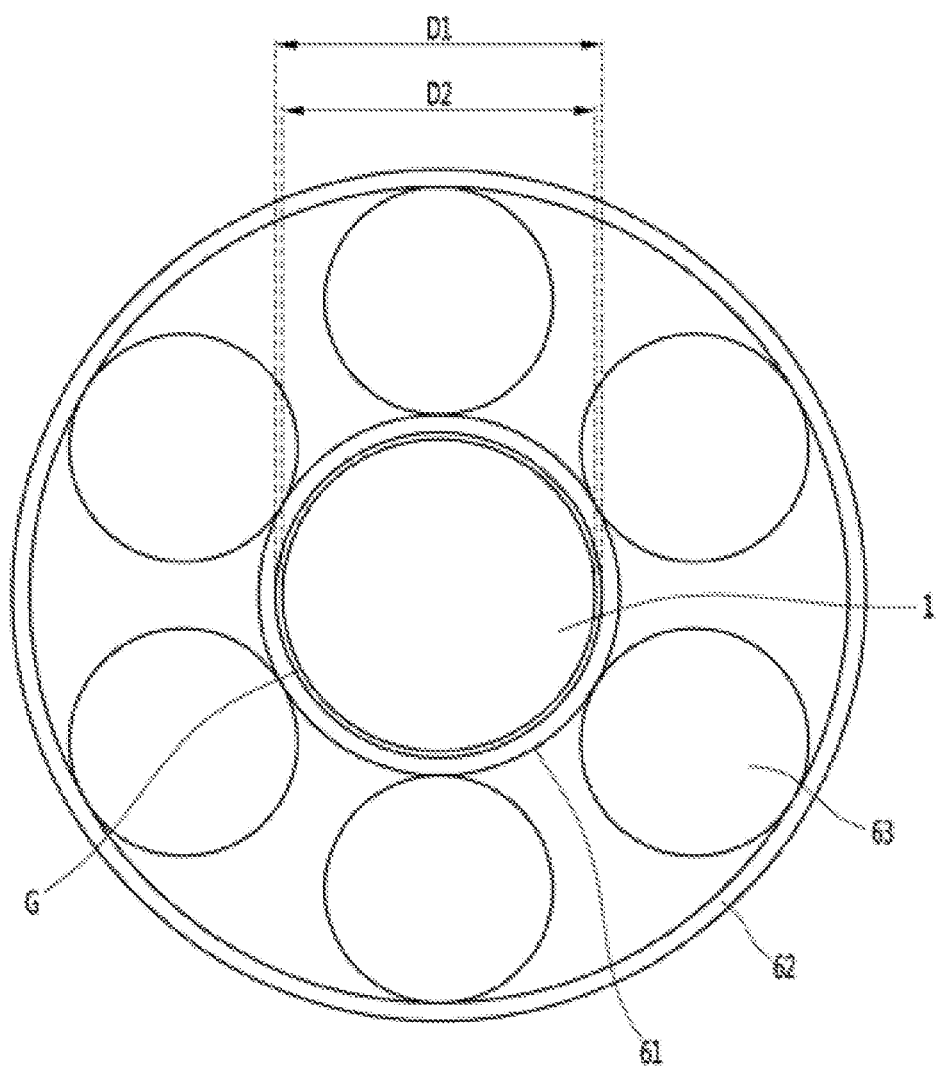
FIG. 7 is a view showing a rotor assembly when a rotating shaft is rotated at a high speed according to an embodiment of the present disclosure.

FIG. 4 is a longitudinal cross-sectional view showing a rotor assembly when a rotating shaft is stopped or is rotated at a low speed according to an embodiment of the present disclosure, FIG. 5 is a view showing a rotor assembly when a rotating shaft is stopped or rotated at a low speed according to an embodiment of the present disclosure, FIG. 6 is a longitudinal cross-sectional view showing the rotor assembly when the rotating shaft is a high speed rotation according to an embodiment of the present disclosure, and FIG. 7 is a view showing a rotor assembly when a rotating shaft is rotated at a high speed according to an embodiment of the present disclosure.

The spring 8a may be installed on the outer ring 62 of the bearing 6, and when no external force is applied, as shown in FIG. 4, may elastically support the pusher 9 to a position P1 spaced apart from the inner ring 61 of the bearing 6.

One end of the spring 8a may be connected to the outer ring 62 of the bearing 6, and the other end of the spring 8a may be connected to the moving body 90. An example of the spring 8a may be a coil spring. The spring 8a may be supported by the outer ring 62 of the bearing 6 to elastically support the moving body 90 in a direction away from the outer ring 62 of the bearing 6.

The pusher 9 may include a pressure surface 91 on which pressure of gas, such as air, acts. The pressure surface 91 may be a surface on which the pressure of the air flowing by the impeller 4 acts.

When the pressure acting on the pressure surface 91 is less than a set value, the pusher 9 may be retracted away from the inner ring 61 of the bearing 6 by the elastic force of the spring 8a, as shown in FIG. 4. When the rotating shaft 1 rotates at a low speed, the pressure of the air flowing by the impeller 4 acting on the pressure surface 91 may be less than the set value, and the pusher 9 may be spaced apart from the inner ring 61 of the bearing 6 as shown in FIG. 4.

The pusher 9 may be connected to the spring 8a and retracted to a first position P1 spaced apart from the inner ring 61 of the bearing 6 by the spring 8a. When the pressure acting on the pressure surface 91 is less than the elastic force of the spring 8a, the spring 8a may elastically support the pusher 9 in a direction away from the inner ring 61 of the bearing 6 and the pusher 9 may be spaced apart from the inner ring 61 of the bearing 6 by a spring 8a.

On the other hand, when the pressure acting on the pressure surface 91 is greater than or equal to the set value, the pusher 9 may be advanced in a direction closer to the inner ring 61 of the bearing 6 while compressing the spring 8a as shown in FIG. 6.

When the rotating shaft 1 rotates at a high speed, the pressure of the air flowing by the impeller 4 acting on the pressure surface 91 may be greater than or equal to the set value, and the pusher 9 may be advanced toward the inner ring 61 of the bearing 6.

The pusher 9 may be advanced to a second position P2 at which the pusher 9 is rubbed against the inner ring 61 of the bearing 6 due to the pressure acting on the pressure surface 91 as shown in FIG. 6. When the pressure acting on the pressure surface 91 is greater than the elastic force of the spring 8a, the pusher 9 may compress the spring 8a, and the pusher 9 may be moved in a direction closer to the inner ring 61 of the bearing 6 by the pressure acting on the pressure surface 91.

Referring to FIGS. 4 and 5, the inner ring 61 of the bearing 6 may be rotated with the rotating shaft 1 by being rubbed against the rotating shaft 1 when the pusher 9 is in the first position P1. When the rotating shaft 1 is stopped or is rotated at a low speed, a portion of the rotating shaft 1 which faces the inner ring 61 of the bearing 6 may be a contact portion CT1, is brought into contact with the inner ring 61 of the bearing 6 by the weight of the rotating shaft 1 itself and the contact portion CT1 may be a portion in which the inner ring 61 of the bearing 6 rubs against the rotating shaft 1 when the rotating shaft 1 rotates at a low speed.

When the pusher 9 is in the second position P2 as shown in FIG. 6, the inner ring 61 of the bearing 6 may be spaced apart from the rotating shaft 1 by an air gap "G" formed between the inner ring 61 of the bearing 6 and the rotating shaft 1.

When the frictional force between the inner ring 61 of the bearing 6 and the pusher 9 is smaller than the frictional force between the inner ring 61 of the bearing 6 and the rotating shaft 1, the inner ring 61 of the bearing 6 may be rotated with the rotating shaft 1 in a state of being in contact with or rubbed against the rotating shaft 1 shown in FIGS. 4 and 5, and in this case, the bearing 6 may function as a rolling bearing.

When the frictional force between the inner ring 61 of the bearing 6 and the pusher 9 is greater than the frictional force between the inner ring 61 of the bearing and the rotating shaft 1, the inner ring 61 of the bearing 6 is maintained at a state of being spaced apart from the rotating shaft 1 by gas in the air gap "G" formed between the inner ring 61 of the bearing 6 and the rotating shaft 1, and in this case the bearing 6 may function as a gas bearing.

It is preferable that the pusher 9 has a configuration that is movable while being rubbed against the inner ring 61 of the bearing 6 with a high frictional force.

To this end, the pusher 9 may include a moving body 90 and a friction pad 100.

A pressure surface 91 may be formed on the moving body 90, and the moving body 90 may be elastically supported by the spring 8a and retracted to the first position P1.

The moving body 90 may be preferably disposed to be spaced apart from the rotating shaft 1 on the outside of the rotating shaft 1 regardless of the first position P1 and the second position P2, and an inner diameter D5 of the moving body 90 may be larger than the outer diameter D2 of the rotating shaft 1. The inner diameter D5 of the moving body 90 may be larger than the inner diameter D1 of the inner ring 61 of the bearing 6.

The moving body 90 may be formed with a spring receiving groove 93 in which the spring 8a is received on the opposite side of the pressure surface 91.

The moving body 90 may have a spring connection portion 94 formed in the spring receiving groove 93.

The moving body 90 may have a friction pad fixing surface 95 to which the friction pad 100 is attached on the opposite side of the pressure surface 91.

The friction pad 100 may be attached to the moving body 90, and when the pusher 9 is in the second position P2, as shown in FIG. 6, the friction pad 100 is rubbed against the inner ring 61 of the bearing 6.

The frictional force between the friction pad 100 and the inner ring 61 may be greater than the frictional force between the inner ring 61 of the bearing 6 and the rotating shaft 1.

The friction pad 100 may be preferably disposed spaced apart from each of the rotating shaft 1 and the spring 8a regardless of its position. To this end, the outer diameter D3 of the friction pad 100 may be smaller than the inner diameter D4 of the spring 8a, and the inner diameter D5 of the friction pad 100 is larger than the outer diameter D2 of the rotating shaft 1.

The frictional force between the inner ring 61 of the bearing 6 and the friction pad 100 may be preferably greater than the frictional force between the inner ring 61 of the bearing 6 and the rotating shaft 1. To this end, a surface of the friction pad 100 that faces the inner ring 61 of the bearing 6 may preferably have a high coefficient of friction, and a preferred example of the friction pad 100 may be rubber.

The surface of the friction pad 100 that faces the inner ring 61 of the bearing 6 may be a friction portion CT2 that is rubbed against the inner ring 61 of the bearing 6 when the pusher 9 is in the second position P2 and the friction coefficient of the friction portion CT2 may be preferably greater than the friction coefficient of the contact portion CT1. For example, when the friction coefficient of the contact portion CT1 is 0.1, the friction coefficient of the friction portion CT2 may be in a range of from 2 to 10.

Hereinafter, the operation of the present disclosure configured as described above is as follows.

First, when the rotating shaft 1 is stopped or is rotated at a low speed, the inner ring 61 of the bearing 6 and the friction pad 100 may be spaced apart from each other not to contact each other, as shown in FIG. 4, and a portion of the rotating shaft 1 that radially faces the inner ring 61 of the bearing 6 may hang or be bent downward due to the self-weight, and a portion of the rotating shaft 1 that faces the inner ring 61 of the bearing 6 may contact and rub against the inner ring 61 of the bearing 6.

The frictional force between the rotational shaft 1 and the inner ring 61 of the bearing 6 may be greater than the frictional force of the rolling member 63, and when the rotating shaft 1 is rotated in a state of being in contact with the inner ring 61 of the bearing 6, the inner ring 61 of the bearing 6 may be rotated together with the rotating shaft 1, and the rolling member 63 of the bearing 6 itself rotates along the inner ring 61 of the bearing 6. In this case, the bearing 6 may function as a rolling bearing, in particular, a ball bearing, which supports the rotating shaft 1 in a state of being in contact with the rotating shaft 1.

On the other hand, when the rotating shaft 1 is switched to the high speed rotation during stopping or the low speed rotation, the moving body 90 may be advanced toward the inner ring 61 of the bearing 6 while compressing the spring 8a by the pressure acting on the pressure surface 91. When the moving body 90 is advanced, the friction pad 100 may contact the inner ring 61 of the bearing 6 and be rubbed against the inner ring 61 of the bearing 6.

When the inner ring 61 of the bearing 6 is rubbed against the friction pad 100 as described above, the frictional force between the inner ring 61 of the bearing 6 and the friction pad 100 (that is, the frictional force of the friction portion CT2) is greater than the frictional force between the inner ring 61 of the bearing 6 and the rotating shaft 1 (that is, the frictional force of the contact portion CT1), and the rotational speed of the inner ring 61 of the bearing 6 may be sharply reduced relative to the rotating shaft 1 due to the frictional force between the inner ring 61 of the bearing 6 and the friction pad 100.

When the rotational speed of the inner ring 61 of the bearing 6 is slower than the speed of the rotating shaft 1 or when the inner ring 61 of the bearing 6 is stopped and the rotating shaft 1 is rotated at a high speed, gas such as air may be introduced between the inner ring 61 of the bearing 6 and the rotating shaft 1 due to a speed difference between the inner ring 61 of the bearing 6 and the rotating shaft 1, the air gap "G" may be formed between the inner ring 61 of the bearing 6 and the rotating shaft 1 as shown in FIGS. 6 and 7, and gas such as air in the air gap "G" may support the rotating shaft 1. In this case, the bearing 6 functions as a gas bearing.

That is, the bearing 6 of the present embodiment may be a hybrid bearing capable of functioning as a rolling bearing in the case of low speed rotation of the rotating shaft 1, and functioning as a gas bearing in the case of high speed rotation of the rotating shaft 1. In this case, the bearing 9 may support the rotating shaft 1 with high reliability in all speed ranges including the low speed and the high speed of the rotating shaft 1.

According to the embodiment of the present disclosure, the bearing functions as a rolling bearing to stably support the rotating shaft rotated at low speed when the rotating shaft is rotated at a low speed, and the bearing functions as a gas bearing to support the rotating shaft rotated at high speed when the rotating shaft is rotated at a high speed.

In addition, since the rolling bearing function and the gas bearing function of the bearing are automatically switched by a difference in the frictional force between the inner ring of the bearing and the pusher and the frictional force between the inner ring of the bearing and the rotating shaft, a driving source for a motor for switching the functions of the bearing or the like and power consumption for operating the driving source are not required.

In addition, since the position of the pusher is changed by the pressure of air, there is no need for a separate pusher moving mechanism for moving the pusher, and there is an advantage that the structure is simple.

In addition, the pusher may prevent fine particles such as dust from penetrating into the bearing and may extend the lifespan the bearing.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the disclosure but by the appended claims, and all differences within the scope will be construed as being included in the present disclosure.

What is claimed is:

1. A motor comprising:
    a rotating shaft;
    a rotor connected to the rotating shaft;
    an impeller connected to the rotating shaft;
    a bearing comprising an inner ring, an outer ring, and a rolling member disposed between the inner ring and the outer ring, an inner diameter of the inner ring being greater than an outer diameter of the rotating shaft;
    a bearing housing that defines a bearing receiving portion configured to support the bearing; and
    a pusher disposed within the bearing receiving portion and configured to move between a first position spaced apart from the inner ring and a second position contacting the inner ring,
    wherein the inner ring is configured to, based on the pusher being at the second position, become detached from the rotating shaft to thereby define a gap between the inner ring and the rotating shaft.

2. The motor of claim 1, further comprising:
a spring that connects between the pusher and the outer ring and that is configured to cause the pusher to move to the first position away from the inner ring.

3. The motor of claim 2, wherein the pusher comprises:
a moving body that defines a pressure surface configured to receive air pressure applied by air blown by the impeller, the moving body being supported by the spring and configured to move between the first position and the second position; and
a friction pad attached to the moving body and configured to cause friction to the inner ring based on the pusher being at the second position.

4. The motor of claim 3, wherein an inner diameter of the moving body is greater than each of the outer diameter of the rotating shaft and the inner diameter of the inner ring.

5. The motor of claim 3, wherein the pusher is configured to apply frictional force between the frictional pad and the inner ring that is greater than friction between the inner ring and the rotating shaft.

6. A motor comprising:
a rotating shaft;
a rotor connected to the rotating shaft;
an impeller connected to the rotating shaft;
a bearing comprising an inner ring, an outer ring, and a rolling member disposed between the inner ring and the outer ring, an inner diameter of the inner ring being larger than an outer diameter of the rotating shaft;
a spring connected to the outer ring; and
a pusher connected to the spring, the pusher being configured to:
based on force applied by the spring, move away from the inner ring to a first position spaced apart from the inner ring, and
based on an air pressure applied to a pressure surface of the pusher by air blown by the impeller, move to a second position located closer to the inner ring than the first position,
wherein the inner ring is configured to:
based on the pusher being at the first position, rotate with the rotating shaft by friction with the rotating shaft, and
based on the pusher being at the second position, become detached from the rotating shaft to thereby define a gap between the inner ring and the rotating shaft.

7. The motor of claim 6, wherein the pusher comprises:
a moving body that defines the pressure surface, that is supported by the spring, and that is configured to move between the first position and the second position; and
a friction pad attached to the moving body and configured to cause friction to the inner ring based on the pusher being at the second position.

8. The motor of claim 7, wherein an inner diameter of the moving body is greater than the outer diameter of the rotating shaft.

9. The motor of claim 7, wherein an inner diameter of the moving body is greater than the inner diameter of the inner ring.

10. The motor of claim 7, wherein the moving body defines a spring receiving groove that receives the spring and that is disposed at a side of the moving body opposite to the pressure surface.

11. The motor of claim 10, wherein the moving body comprises a spring connection portion disposed in the spring receiving groove and coupled to the spring.

12. The motor of claim 7, wherein the moving body comprises a friction pad fixing surface to which the friction pad is attached, the friction pad fixing surface being disposed at a side of the moving body opposite to the pressure surface.

13. The motor of claim 7, wherein the pusher is configured to apply frictional force between the friction pad and the inner ring that is greater than frictional force between the inner ring and the rotating shaft.

14. The motor of claim 7, wherein an outer diameter of the friction pad is less than an inner diameter of the spring.

15. The motor of claim 7, wherein an inner diameter of the friction pad is greater than the outer diameter of the rotating shaft.

16. The motor of claim 6, wherein the bearing and the pusher are arranged between the rotor and the impeller along an axial direction of the rotating shaft.

17. The motor of claim 6, further comprising:
a bearing housing that defines a bearing receiving portion that is configured to support the bearing and that accommodates the pusher and the spring.

18. The motor of claim 6, further comprising:
a sub bearing axially spaced apart from the bearing and configured to support the rotating shaft.

19. The motor of claim 18, wherein the sub bearing is configured to support a portion of the rotating shaft between the bearing and the rotor.

20. The motor of claim 18, wherein the sub bearing comprises a sub inner ring, a sub outer ring, and a ball disposed between the sub inner ring and the sub outer ring, and
wherein the rotating shaft is pressure-fitted onto the sub inner ring.

* * * * *